United States Patent
Bartlett et al.

(10) Patent No.: US 9,179,333 B1
(45) Date of Patent: Nov. 3, 2015

(54) HYBRID AUTOMATIC REPEAT REQUEST BLOCK ERROR RATE CONTROL FOR WIRELESS COMMUNICATIONS

(71) Applicant: Sprint Communications Company L.P., Overland Park, KS (US)

(72) Inventors: Roger Danforth Bartlett, Merriam, KS (US); Christian Erik Seagren, Pleasanton, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 98 days.

(21) Appl. No.: 13/966,521

(22) Filed: Aug. 14, 2013

(51) Int. Cl.
*H04W 4/00* (2009.01)
*H04W 24/02* (2009.01)

(52) U.S. Cl.
CPC ..................................... *H04W 24/02* (2013.01)

(58) Field of Classification Search
None
See application file for complete search history.

(56) References Cited

U.S. PATENT DOCUMENTS

| | | | |
|---|---|---|---|
| 6,983,166 B2 | 1/2006 | Shiu et al. | |
| 7,376,438 B2 | 5/2008 | Shiu et al. | |
| 8,023,988 B2 | 9/2011 | Shiu et al. | |
| 8,312,337 B2 | 11/2012 | Park et al. | |
| 2009/0034425 A1 | 2/2009 | Jansson et al. | |
| 2011/0026408 A1* | 2/2011 | Skarve et al. | 370/242 |
| 2014/0269767 A1* | 9/2014 | Djukic et al. | 370/474 |

* cited by examiner

*Primary Examiner* — Kibrom T Hailu

(57) ABSTRACT

Systems, methods, and software for hybrid automatic repeat request (HARQ) block error rate (BLER) control in wireless communications are provided herein. A wireless access system receives a media packet. The wireless access system also determines a first time difference between an allowable end-to-end delay for the media packet and a first consumed end-to-end delay for the media packet. The wireless access system also processes the first time difference to select a first HARQ BLER and transfers the media packet from the wireless access system using the first HARQ BLER.

20 Claims, 6 Drawing Sheets

| QCI | ALLOWABLE DELAY | CONSUMED TIME (CURRENT - TIMESTAMP) | TIME DIFFERENCE | HARQ BLER |
|---|---|---|---|---|
| 4 | 300ms | 0 - 100mS | 200-300mS | 20 |
| 4 | 300mS | 100-200mS | 100-200mS | 15 |
| 4 | 300mS | 200-250mS | 50-100mS | 10 |
| 4 | 300mS | 250-280mS | 20-50mS | 2 |
| 4 | 300mS | 280-290mS | 10-20mS | 1 |
| 4 | 300mS | 300mS | 0mS | 80-100 |
| 1 | 100mS | 0-40mS | 60-100mS | 20 |
| 1 | 100mS | 40-80mS | 20-60mS | 10 |
| 1 | 100mS | 80-90mS | 10-20mS | 2 |
| 1 | 100mS | 90-95mS | 5-10mS | 1 |
| 1 | 100mS | 100mS | 0mS | 80-100 |

FIGURE 4

HYBRID AUTOMATIC REPEAT REQUEST BLOCK ERROR RATE CONTROL FOR WIRELESS COMMUNICATIONS

TECHNICAL BACKGROUND

Wireless access systems typically include equipment such as wireless access nodes along with various control and routing nodes which provide wireless access to communication services for wireless communication devices over wireless links. A typical wireless access system includes systems to receive media packets, schedule the transmission of the media packets, and transmit the media packets to a wireless communication device. The wireless access systems exchange user communications between wireless communication devices, service providers, and other end user devices. The user communications typically include voice calls or streaming video, among other communication services.

Utilizing hybrid automatic repeat request (HARQ), the media packets sent to the wireless communication device include error detecting codes and/or forward error correcting codes. In some instances, media packets are not received at the wireless communication device successfully. In these instances, the wireless communication device sends a negative acknowledgement (NACK). The wireless access system will then resend the media packet until the wireless access system has received an ACK from the wireless communication device.

The wireless access system estimates the block error rate (BLER) by calculating the ratio of the number of erroneous blocks received versus the total number of blocks sent. Parameters of the channel can be adjusted to ensure that the calculated BLER is what is expected of the channel. Packets may also not be re-sent if the BLER is a high value and most of the other packets have been successfully received.

Overview

Systems, methods, and software for selecting a HARQ BLER are provided herein. In one example, a method of operating a wireless access system that includes receiving a media packet. The method also includes determining a first time difference between an allowable end-to-end delay for the media packet and a first consumed end-to-end delay for the media packet. The method also includes processing the first time difference to select a first HARQ BLER and transferring the media packet from the wireless access system using the first HARQ BLER.

In another example, a wireless access system is configured for selecting a HARQ BLER. The wireless access system includes a network receiver configured to receive a media packet. The wireless access system also includes a BLER control system configured to determine a first time difference between an allowable end-to-end delay for the media packet and a first consumed end-to-end delay for the media packet. The BLER control system is also configured to process the first time difference to select a first HARQ BLER. The wireless access system also includes a HARQ transceiver configured to transfer the media packet from the wireless access system using the first HARQ BLER.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 4 is a table illustrating selection of HARQ BLER in a wireless access system.

DETAILED DESCRIPTION

Implementations disclosed herein provide for selecting a HARQ BLER based on a time difference between an allowable end-to-end delay and a consumed end-to-end delay. For time-critical applications, such as voice and video, a media packet could have an allowable end-to-end delay. The media packet needs to be received by the wireless communication device before a certain point in time; otherwise the media packet is no longer needed. As an example, when a media packet in a voice call is not received before the critical point in time, the user may experience a missed portion of a word in the audio. After this point in time, the media packet is no longer needed as the conversation has proceeded beyond where this media packet was to be utilized. In this instance, the media packet no longer needs to be sent to the wireless communication device. Certain levels of missed media packets are allowed while still providing an acceptable user experience for the voice or video transmission.

In an operational example, when the time difference between an allowable end-to-end delay and a consumed end-to-end delay provides for adequate time to resend a media packet, a nominal HARQ BLER could be selected. In this instance, there may be adequate time to resend the media packet multiple times before the media packet is no longer needed. As the time difference becomes smaller, there may only be time to resend the media packet once or twice. In this instance, the HARQ BLER could be reduced thereby providing direction to the HARQ scheduler to resend the media packet sooner or adjust parameters of the channel to ensure the media packet is successfully received.

Once the consumed end-to-end delay is greater than the allowable end-to-end delay, the media packet is no longer needed by the wireless communication device. In this instance, the HARQ BLER could be set to a high value providing direction to the HARQ scheduler that a high BLER is acceptable and the media packet may not need to be sent.

HARQ BLER could also be selected based on a service plan of the wireless communication device. In some instances, a service plan may request a lower BLER. In this instance, the HARQ BLER may have a smaller nominal value than a service plan which allows for a higher BLER. This may also allow for the HARQ BLER being reduced at a much faster rate.

Figure 1:
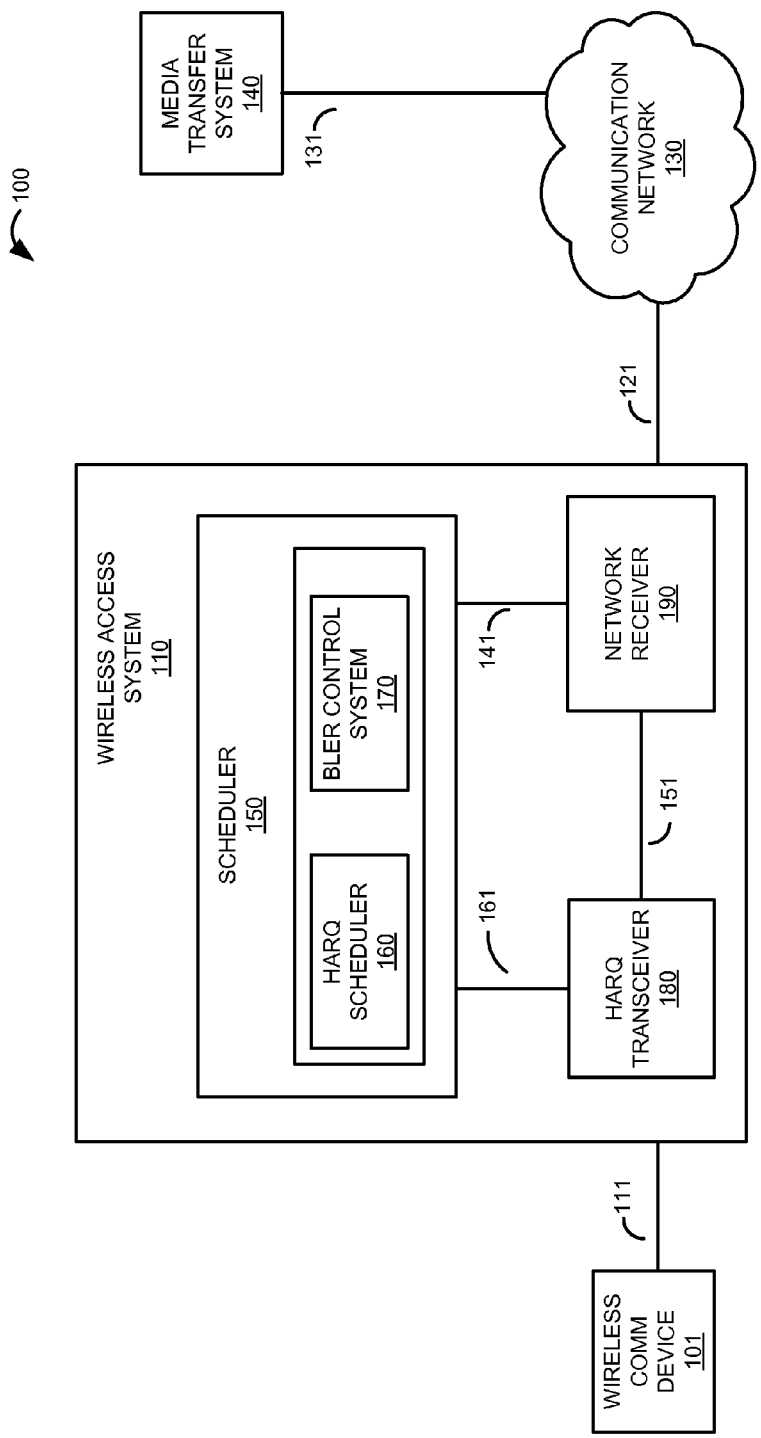
FIG. 1 is a system diagram illustrating a communication system.

FIG. 1 is a system diagram illustrating communication system 100. Communication system 100 includes wireless communication device 101, wireless access system 110, communication network 130, and media transfer system 140. Wireless access system 110 and wireless communication device 101 communicate over wireless link 111. Wireless access system 110 communicates with communication network 130 over link 121. Communication network 130 and media transfer system 140 communicate over link 131.

Wireless access system 110 includes scheduler 150, HARQ transceiver 180, and network receiver 190. Scheduler 150 includes HARQ scheduler 160 and BLER control system 170. Network receiver 190 communicates with scheduler 150 over link 141. Scheduler 150 communicates with HARQ transceiver 180 over link 161. Network receiver 190 communicates with HARQ transceiver 180 over link 151. Wireless access system 110 can be distributed or consolidated among equipment or circuitry that together forms the elements of wireless access system 110. Wireless access system 110 can optionally include additional devices, features, or functionality not discussed here for purposes of brevity.

The following is an operational discussion of FIG. 1, which is a representation of just some operations of communication system 100. Other operations are possible and may be considered within the scope of the present disclosure. In this example, media packets originate at media transfer system 140. Media transfer system 140 could be any system where media packets could originate. For example, media packets could originate from another wireless communication device or a web server providing video content. These are just some examples of where media packets could originate and other sources of media packets are possible and may be considered within the scope of the present disclosure.

The media packets could be voice or video streams or other types of data packets. An example of another type of data packet could be for real-time gaming. These are just some examples of types of media packets and other types of media packets are possible and may be considered within the scope of the present disclosure. The media packets could have a timestamp incorporated into the data to determine when the packet of data was sent or when the packet was sent in relation to other packets sent. The media packets could also have other mechanisms to determine where in the sequence each individual packet belongs. An example of this could be having a number incorporated into the data to determine which packet in the sequence of the data the packet belongs. These are just some examples of how the sequence of media packets are tracked and other sequencing methods are possible and may be considered within the scope of the present disclosure.

The media packet is then sent on to communication network 130 where it is sent on to wireless access system 110. Communication network 130 could be any system which communicates with a wireless access system. For example, communication network 130 could be a P-gateway or S-Gateway. These are just some examples of a communication network 130 and other systems are possible and may be considered within the scope of the present disclosure.

The media packet encounters delay as it is being sent from media transfer system 140 to wireless access system 110. This delay could be considered as part of the consumed end-to-end delay. There could also be delay within wireless access system 110 before the media packet is sent to wireless communication device 101. This delay could also be considered as part of the consumed end-to-end delay. These are just some examples of delays that could be considered as part of the consumed end-to-end delay and other delays considered as part of the consumed end-to-end delay are possible and considered within the scope of the present disclosure.

Network receiver 190 is configured to receive a media packet over link 121. The media packet is then sent to HARQ transceiver 180 over link 151. Media packet information, such as Quality of Service Class Identifier (QCI) class and timestamp, are sent to BLER control system 170 within scheduler 150 over link 141. Other media packet information, including the media packet itself, could be sent to scheduler 150 over link 141.

BLER control system 170 is configured to determine a first time difference between an allowable end-to-end delay for the media packet and a first consumed end-to-end delay for the media packet. An example of determining an allowable end-to-end delay could be accomplished by utilizing a QCI table. Another example of determining an allowable end-to-end delay could be accomplished based on media type. A voice media packet could have a different allowable end-to-end delay than video media packet. Different voice media packets could also have different allowable end-to-end delays. These are just some examples of determining allowable end-to-end delay and other methods of determining allowable end-to-end delay are possible and may be considered within the scope of the present disclosure.

An example of determining a first consumed end-to-end delay could be accomplished by utilizing a timestamp of the media packet. The first consumed end-to-end delay could be the difference between the current time and the timestamp. Another example of determining the first consumed end-to-end delay could be based on when the packets were received by the wireless access system. These are just some examples of determining a consumed end-to-end delay and other methods of determining consumed end-to-end delay are possible and may be considered within the scope of the present disclosure.

An example of determining a time difference between an allowable end-to-end delay of a media packet and a consumed end-to-end delay of a media packet could be determined by taking the difference between the allowable end-to-end delay and the consumed end-to-end delay. Other delays within or outside of the wireless access system could be subtracted from the allowable end-to-end delay or added to the consumed end-to-end delay before determining the time difference.

BLER control system 170 is also configured to identify a HARQ NACK for the media packet. A HARQ NACK could be identified for the media packet by receiving a HARQ NACK from the wireless communication device or by not receiving an acknowledgement (ACK) in the appropriate amount of time. These are just some examples of identifying a HARQ NACK for the media packet and other methods of identifying a HARQ NACK for the media packet are possible and considered within the scope of the present disclosure. BLER control system 170 is also configured to determine a second time difference between an allowable end-to-end delay for the media packet and a second consumed end-to-end delay for the media packet.

BLER control system 170 is also configured to process the time difference to select a HARQ BLER. A first HARQ BLER could be selected based on the time difference or a HARQ BLER could be selected based on the time difference and other information. Other information could include information within the media packet such as a QCI class type. The other information could also include the media type of the media packet. These are just some examples of other information used to select a HARQ BLER and other information is possible to be used to select a HARQ BLER. For the second HARQ BLER, the same, a higher, or a lower HARQ BLER could be selected based on the value of the time difference.

HARQ transceiver 180 is configured to transfer the media packet from the wireless access system using the HARQ BLER. This could include the initial transfer of the media packet or the re-transfer of the media packet. The HARQ transceiver 180 could also be configured to block re-transfer of the media packet from the wireless access system using the second HARQ BLER.

Figure 2:
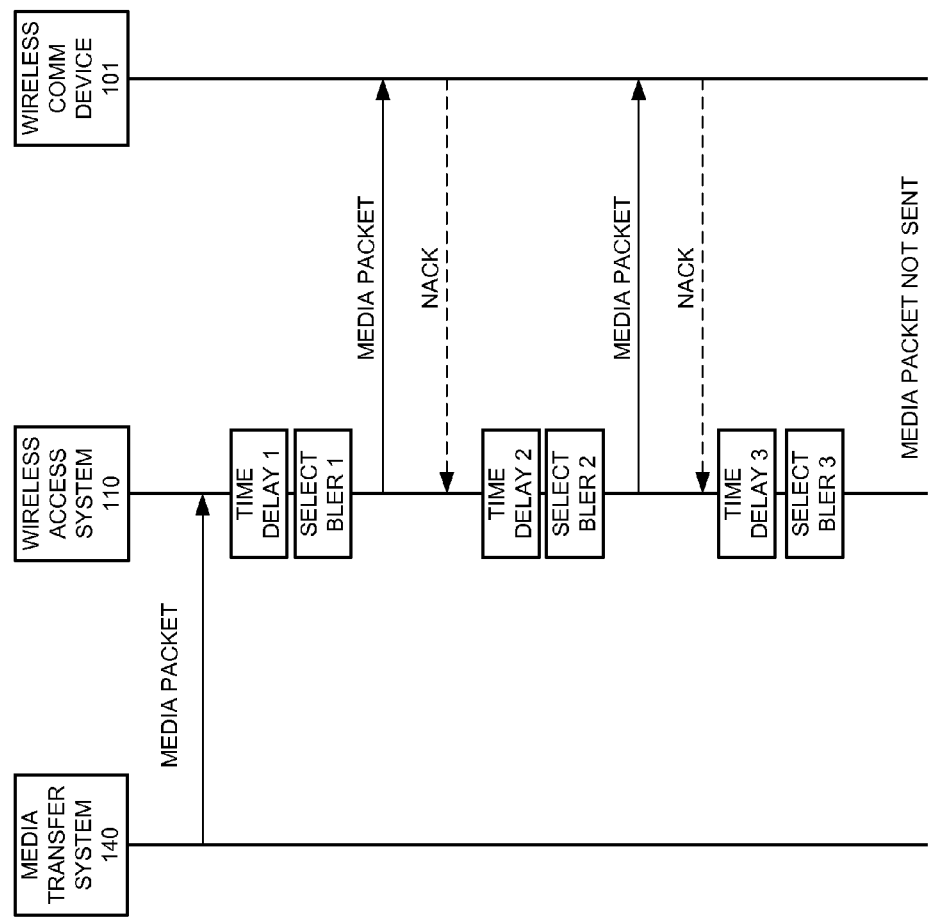
FIG. 2 is a flow diagram illustrating an example communication flow.

FIG. 2 illustrates a flow diagram which describes an example media packet flow in communication system 100 of FIG. 1. In this example, the operation of wireless access system 110 is shown. Wireless access system 110 receives a media packet from media transfer system 140. Wireless access system 110 determines time delay 1, which could be a first consumed end-to-end delay for the media packet. Time delay 1 could be calculated based on the difference between the current time and the timestamp of the media packet. Time delay 1 could also include delay within wireless access system 110. Wireless access system 110 then processes the time difference between the allowable end-to-end delay and time delay 1 to select BLER 1, which could be a first HARQ BLER. The allowable end-to-end delay could be determined from a QCI table, media type, or other means. The media packet is transferred from wireless access system 110 using BLER 1.

Wireless access system 110 then receives a HARQ NACK from wireless communication device 101. A HARQ NACK could also be identified for the media packet by not receiving an acknowledgement (ACK) in the appropriate amount of time. These are just some examples of identifying a HARQ NACK for the media packet and other methods of identifying a HARQ NACK for the media packet are possible and considered within the scope of the present disclosure.

Wireless access system 110 then determines time delay 2, which could be a second consumed end-to-end delay for the media packet. Wireless access system 110 then processes the time difference between the allowable end-to-end delay and time delay 2 to select BLER 2, which could be a second HARQ BLER. In this example, time delay 2 could be less than time delay 1 as time has passed since time delay 1 was determined. As such, BLER 2 could be a lower value than BLER 1. The media packet is transferred from wireless access system 110 using BLER 2.

Wireless access system 110 then receives a HARQ NACK from wireless communication device 101. Wireless access system 110 then determines time delay 3, which could be a second consumed end-to-end delay for the media packet. Wireless access system 110 then processes the time difference between the allowable end-to-end delay and time delay 3 to select BLER 3, which could be a second HARQ BLER. In this instance, the media packet is not sent. An example of why the media packet is not sent could be time delay 3 was greater than the allowable end-to-end delay. In this instance, the wireless communication device would no longer need the media packet as the media packet would not be utilized.

In another example, the time difference between time delay 3 and the allowable end-to-end delay could be small and the wireless access system could determine that the media packet would not arrive at wireless communication device 101 in time for wireless communication device to utilize the media packet. These are just some examples of why a media packet is not sent and other reasons for not sending the media packet are possible and considered within the scope of the present disclosure.

In this example, BLER 3 could have been selected to be a high value signifying that a high error rate is acceptable so the media packet may not need to be sent. In this instance, the media packet was not sent. BLER 3 could also have been selected to be a nominal or low value. In this instance, the media packet would not have been sent for reasons other than having an acceptably high error rate.

The example in FIG. 2 shows three BLER values being selected. This is just one example of operation of wireless access system 110 and other operations are possible. As an example, after receiving the first NACK and selecting BLER 2, wireless access system could have blocked re-transfer of the media packet. This media packet would not have been sent and no further time differences or HARQ BLER values would be determined. As another example, the media packet could have been successfully received after the selection of BLER 2 and re-transfer of the media packet. As a further example, the determining of a time difference and selection of a HARQ BLER could have occurred many times before either the media packet was received successfully or the re-transfer was blocked.

Figure 3:
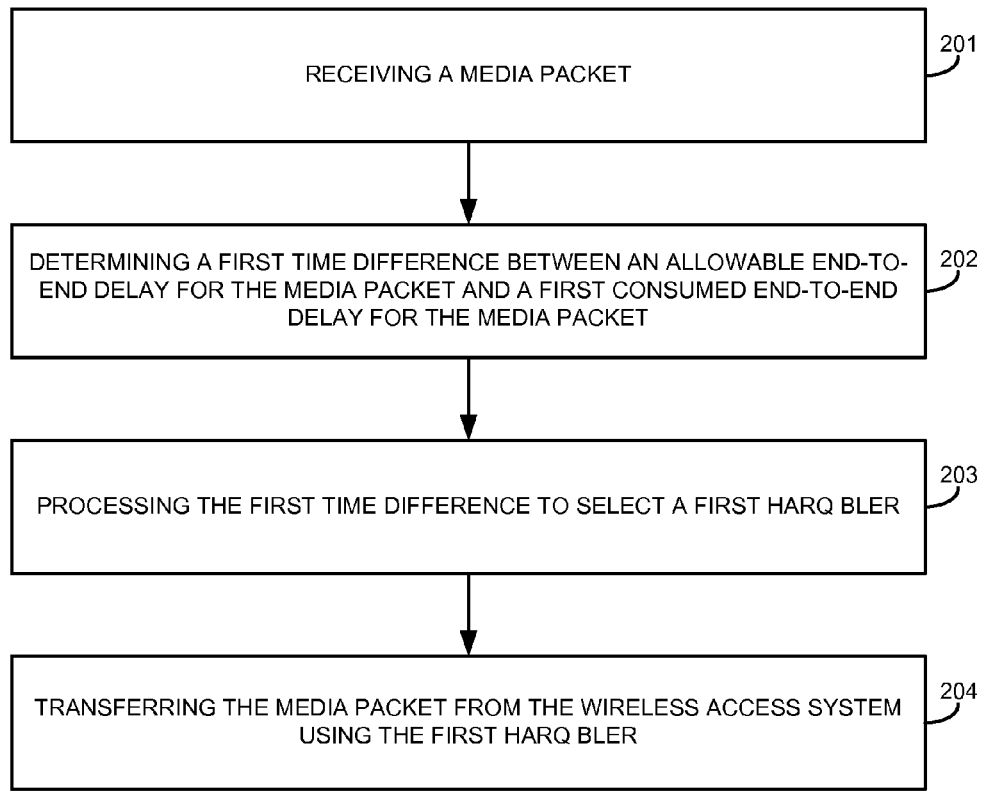
FIG. 3 is a flow diagram illustrating a method of operation of a wireless access system.

FIG. 3 is a flow diagram that describes an example method of operation of a wireless access system, such as for wireless access system 110. The operations of FIG. 3 are referenced parenthetically in the description below.

Wireless access system 110 receives a media packet (201). The media packet could be voice or video streams or another type of data packet. An example of another type of data packet could be a media packet for real-time gaming. These are just some examples of types of media packets and other types of media packets are possible and may be considered within the scope of the present disclosure.

Wireless access system 110 determines a first time difference between an allowable end-to-end delay for the media packet and a first consumed end-to-end delay for the media packet (202). An example of determining an allowable end-to-end delay could be accomplished by utilizing a QCI table. Another example of determining an allowable end-to-end delay could be accomplished based on media type. A voice media packet could have a different allowable end-to-end delay than video media packet. Different voice media packets could also have different allowable end-to-end delays. These are just some examples of determining allowable end-to-end delay and other methods of determining allowable end-to-end delay are possible and may be considered within the scope of the present disclosure.

An example of determining a first consumed end-to-end delay could be accomplished by utilizing a timestamp of the media packet. The first consumed end-to-end delay could be the difference between the current time and the timestamp of the media packet. Another example of determining the first consumed end-to-end delay could be based on when the packets were received by the wireless access system. These are just some examples of determining a consumed end-to-end delay and other methods of determining consumed end-to-end delay are possible and may be considered within the scope of the present disclosure.

An example of determining a time difference between an allowable end-to-end delay of a media packet and a consumed end-to-end delay of a media packet could be determined by taking the difference between the allowable end-to-end delay and the consumed end-to-end delay. Other delays within or outside of the wireless access system could be subtracted from the allowable end-to-end delay or added to the consumed end-to-end delay before determining the time difference. Delays in other areas of communication system 100 could be delays within or outside of the wireless access system.

Wireless access system 110 could also determine a second time difference between an allowable end-to-end delay for the media packet and a second consumed end-to-end delay for the media packet. An example of this was shown above in FIG. 2. A first time difference between an allowable end-to-end delay for the media packet and a first consumed end-toend delay was determined. At some later time, a second time difference between an allowable end-to-end delay for the media packet and a second consumed end-to-end delay was determined.

Wireless access system 110 processes the first time difference to select a first HARQ BLER (203). A default HARQ BLER could be selected based on the time difference or a HARQ BLER could be selected based on the time difference and other information. Other information could include information within the media packet such as a QCI class type. The other information could also include the media type of the media packet. For the second HARQ BLER, the same, a higher, or a lower HARQ BLER could be selected based on the value of the time difference. An example is shown below in the discussion of FIG. 4.

Wireless access system 110 could also process a second time difference to select a second HARQ BLER. The second HARQ BLER could be the same, lower, or higher than the first HARQ BLER.

Wireless access system 110 transfers the media packet from the wireless access system using the first HARQ BLER (204). The HARQ BLER could be utilized by a HARQ scheduler to determine when or if a media packet is to be sent to the wireless communication device. Wireless access system 110 could also re-transfer the media packet from the wireless system using a second HARQ BLER. Wireless access system 110 could also block re-transfer of the media packet from the wireless access system using the second HARQ BLER.

FIG. 4 shows an example table illustrating selection of HARQ BLER in a wireless access system, such as for wireless access system 110 of FIG. 1. Consumed time and HARQ BLER values shown are for illustrative purposes only. HARQ BLER could be different for each wireless communication device or could be different on the same wireless communication device at a different time.

Line 1 of the table in FIG. 4 shows that QCI class 4 has been utilized in this example. A QCI table shows class 4 has a 300 mS packet delay budget, which equates to the allowable delay in our example. Allowable delay could also be determined based on media type, wireless service plan, or other methods. These are just some examples of determining an allowable end-to-end delay and other methods of determining allowable end-to-end delay are possible and may be considered within the scope of the present disclosure.

Showing minimal consumed time of 0-100 mS and a time difference of 200-300 mS, a first HARQ BLER of 20 is chosen. Different wireless communication devices could have a different first HARQ BLER selection. The same wireless communication device could also have a different first HARQ BLER selection over different periods of time. Proceeding down through the QCI class 4 portion of the table, the consumed time increases while the time difference decreases. This could cause the selection of a decreasing HARQ BLER. Once the consumed time equals the allowable delay, the time difference is 0 mS. This could cause the selection of a HARQ BLER that is higher than the first HARQ BLER. This allows a HARQ scheduler to decide whether to transfer the media packet or not.

The values shown in the table are for illustrative purposes only. As an example, for a QCI class 4 with 10-20 mS of time difference, a HARQ BLER of 80-100 could be chosen. An example of why this high HARQ BLER is selected could be due to the scheduler knowing the media packet will not be successfully received in time to be utilized at the wireless communication device. Another reason this high HARQ BLER is selected could be due to the wireless plan the customer has. If the customer were to have a lower end wireless plan, a higher BLER could be acceptable.

As another example, for a QCI class 4 media packet with a 100-200 mS time difference, a HARQ BLER of 2 could be chosen. An example of why a lower HARQ BLER is selected could be due to the scheduler knowing there are issues with the channel so efforts to obtain a successful communication could be increased. Another reason a lower HARQ BLER is selected could be based on the wireless plan the customer has. If a customer has a higher level wireless plan, a lower BLER would be expected so efforts to obtain a successful communication could be increased sooner in the process.

Line 7 of the table in FIG. 4 shows that QCI class 1 has been utilized in this example. A QCI table shows class 1 has a 100 mS packet delay budget, which equates to the allowable delay in our example. Allowable delay could also be determined based on media type, wireless service plan, or other methods. These are just some examples of determining an allowable end-to-end delay and other methods of determining allowable end-to-end delay are possible and may be considered within the scope of the present disclosure.

Showing minimal consumed time of 0-40 mS and a time difference of 60-100 mS, a first HARQ BLER of 20 is chosen. Different wireless communication devices could have a different first HARQ BLER selection. The same wireless communication device could also have a different first HARQ BLER selection over different periods of time. Proceeding down through the QCI class 1 portion of the table, the consumed time increases while the time difference decreases. This could cause the selection of a decreasing HARQ BLER. Once the consumed time equals the allowable delay, the time difference is 0 mS. This causes the selection of a HARQ BLER that is higher than the first HARQ BLER. This allows a HARQ scheduler to decide whether to transfer the media packet or not.

As discussed above for QCI class 4, these values are for illustrative purposes only and other values could be chosen. Other values chosen could be the same as those discussed above for QCI class 4 or there may be other reasons for utilizing different HARQ BLER values.

Figure 5:
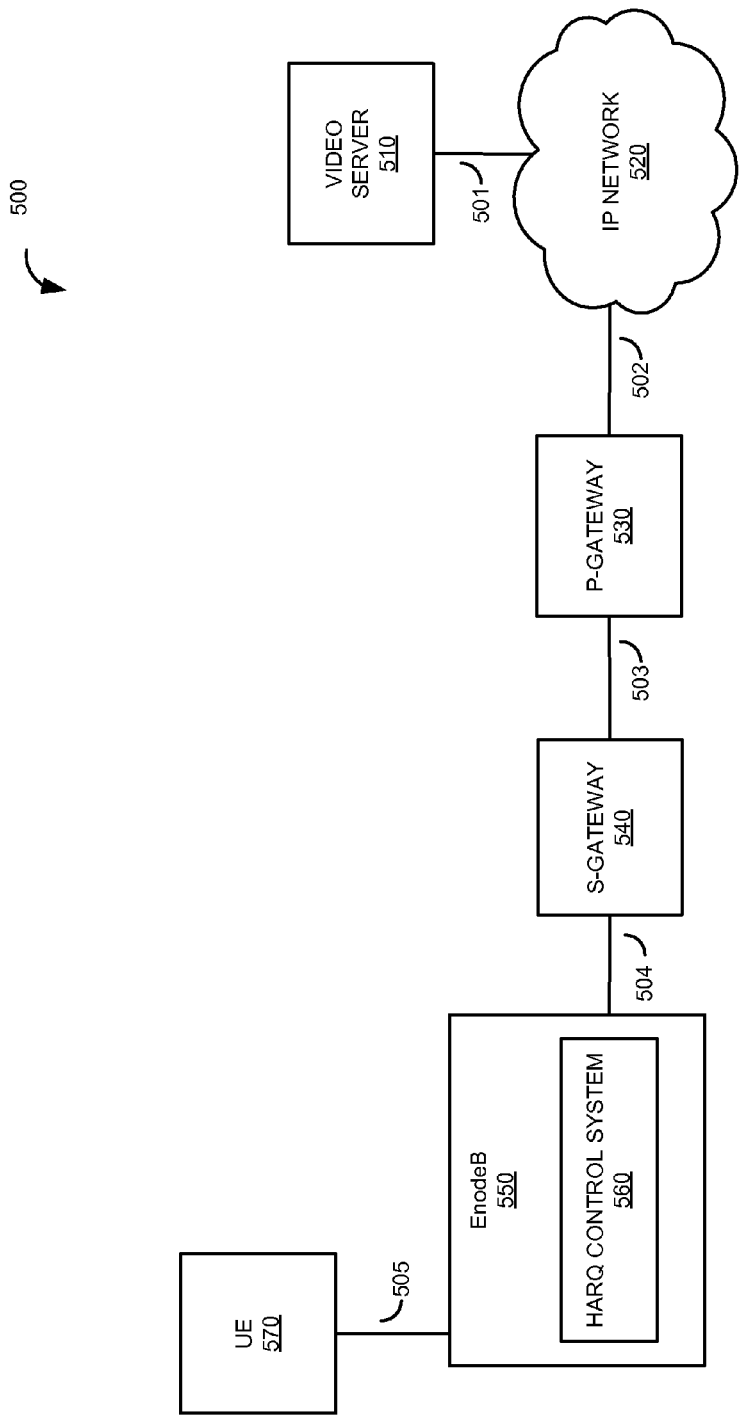
FIG. 5 is a system diagram illustrating a communication system.

FIG. 5 is a system diagram illustrating communication system 500 in one operational embodiment. Communication system 500 includes video server 510, IP network 520, P-gateway 530, S-gateway 540, EnodeB 550, and user equipment (UE) 570. EnodeB 550 includes HARQ control system 560.

A media packet is sent from video server 510 to IP network 520 over link 501. The media packet is then sent on through the P-gateway and S-gateway to EnodeB 550 over links 502-504. Once the media packet is received at EnodeB 550, HARQ control system 560 determines the first time difference between an allowable end-to-end delay for the media packet and a first consumed delay for the media packet. HARQ control system 560 processes the first time difference to select a first HARQ BLER. The media packet is then transferred to UE 570 using the first HARQ BLER over link 505.

If the media packet is successfully received by UE 570, it would then send an acknowledgement (ACK) back to EnodeB 550. In this instance, not further action is taken in regard to the successfully transferred media packet. If the media packet was not successfully received by UE 570, UE 570 would send a negative acknowledgement (NACK) back to EnodeB 550. In this instance, EnodeB 550 would determine the media packet was not successfully transferred. EnodeB 550 not receiving an ACK in the appropriate amount of time would also identify a NACK and that the media packet was not successfully transferred.

If a media packet is not successfully transferred, HARQ control system 560 would identify a HARQ NACK for the media packet. HARQ control system 560 would then determine a second time difference between the allowable end-to-end delay for the media packet and a second consumed end-to-end delay for the media packet. HARQ control system 560 would process the second time difference to select a second HARQ BLER.

The media packet could then be re-transferred to UE 570 using the second HARQ BLER. As long as the media packet is not successfully received, the media packet could continue to be re-transferred to UE 570 using the same second HARQ BLER or a new second HARQ BLER could be used. The media packet could also be blocked from being re-transferred to UE 570.

Figure 6:
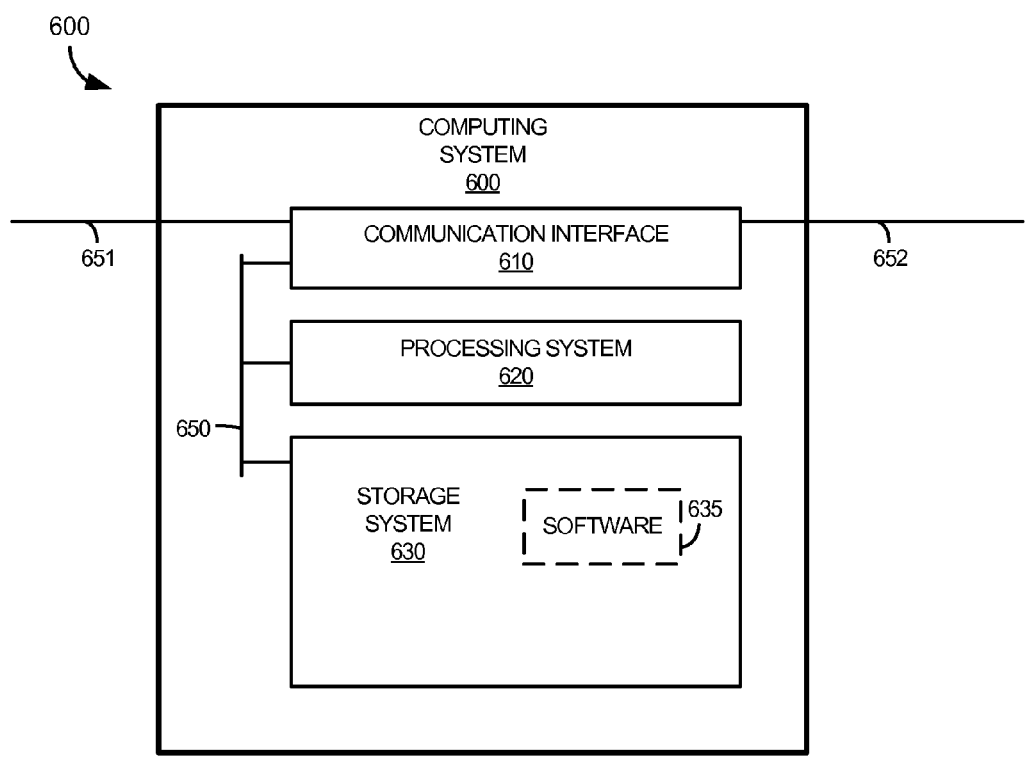
FIG. 6 is a system diagram illustrating a wireless access system.

FIG. 6 is a block diagram illustrates computing system 600 in an exemplary embodiment. Computing system 600 provides an example of a suitable computing system that may be used to implement wireless access system 110 or individual subsystems within wireless access system 110, although wireless access system 110 may have alternative configurations. Computing system 600 can include equipment and systems as discussed herein for wireless access system 110 in FIG. 1, or within eNodeB 550 of FIG. 5, although variations are possible.

Computing system 600 includes communication interface 610, processing system 620, and storage system 630. In operation, processing system 620 is operatively linked to communication interface 610 and storage system 630 by bus 650. It should be understood that discrete links can be employed, such as network links or other circuitry. Computing system 600 can be distributed or consolidated among equipment or circuitry that together forms the elements of computing system 600. Computing system 600 can optionally include additional devices, features, or functionality not discussed here for purposes of brevity.

Communication interface 610 includes a network interface for communicating with communication networks, such as communication network 130 of FIG. 1 or S-gateway 540 of FIG. 5. The network interface can include a T1 interface, or local or wide area network communication interfaces which can communicate over an Ethernet or Internet protocol (IP) link. Examples of the network interface of communication interface 610 include network interface card equipment, transceivers, modems, and other communication circuitry. In this example, the network interface of communication interface 610 communicates over link 652. Link 652 can include any communication link as described herein, such as that described for link 121 in FIG. 1.

Communication interface 610 also includes a wireless interface for communicating with wireless communication devices, such as wireless communication device 101 of FIG. 1 or UE 570 of FIG. 5. The wireless interface can include a modulator, amplifier, filter, and antenna system. Examples of the wireless interface of communication interface 610 include eNodeB, wireless access node, or other communication circuitry. In this example, the wireless interface of communication interface 610 communicates over link 651. Link 651 can include any communication link as described herein, such as that described for link 111 in FIG. 1.

Processing system 620 can comprise one or more microprocessors and other circuitry that retrieves and executes software 635 from storage system 630. Processing system 620 can be implemented within a single processing device but can also be distributed across multiple processing devices or sub-systems that cooperate in executing program instructions. Examples of processing system 620 include general purpose central processing units, application specific processors, and logic devices, as well as any other type of processing device, combinations, or variations thereof.

Storage system 630 can comprise any computer readable storage media readable by processing system 620 and capable of storing software 635. Storage system 630 can include volatile and nonvolatile, removable and non-removable media implemented in any method or technology for storage of information, such as computer readable instructions, data structures, program modules, or other data. In addition to storage media, in some implementations storage system 630 can also include communication media over which software 635 can be communicated. Storage system 630 can be implemented as a single storage device but can also be implemented across multiple storage devices or sub-systems co-located or distributed relative to each other. Storage system 630 can comprise additional elements, such as a controller, capable of communicating with processing system 620. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 635 can be implemented in program instructions and among other functions can, when executed by computing system 600 in general or processing system 620 in particular, direct computing system 600 or processing system 620 to receive media packets, determine a time difference between an allowable end-to-end delay for a media packet and a consumed end-to-end delay for a media packet, process the time difference to select a HARQ BLER, and transfer a media packet from the wireless access system using the HARQ BLER, among other operations. Software 635 can include additional processes, programs, or components, such as operating system software, database software, or application software. Software 635 can also comprise firmware or some other form of machine-readable processing instructions executable by processing system 620.

In general, software 635 can, when loaded into processing system 620 and executed, transform processing system 620 overall from a general-purpose computing system into a special-purpose computing system customized to receive media packets, determine a time difference between an allowable end-to-end delay for a media packet and a consumed end-to-end delay for a media packet, process the time difference to select a HARQ BLER, and transfer a media packet from the wireless access system using the HARQ BLER, among other operations. Encoding software 635 on storage system 630 can transform the physical structure of storage system 630. The specific transformation of the physical structure can depend on various factors in different implementations of this description. Examples of such factors can include, but are not limited to the technology used to implement the storage media of storage system 630 and whether the computer-storage media are characterized as primary or secondary storage. For example, if the computer-storage media are implemented as semiconductor-based memory, software 635 can transform the physical state of the semiconductor memory when the program is encoded therein. For example, software 635 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Computing system 600 can also include other elements, such as user interfaces, computer systems, databases, distributed storage and processing elements, and the like. Computing system 600 can be included in the equipment or systems of wireless access system 110 of FIG. 1 or EnodeB of FIG. 5, or can be included in separate equipment or systems, including combinations thereof.

Referring back to FIG. 1, wireless communication device 110 can receive wireless access to communication services over link 111. Wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access system 110.

Wireless access system 110 provides wireless access to wireless communication device for communication services over link 111. Wireless access system 110 comprises RF communication circuitry and an antenna. The RF communication circuitry typically includes an amplifier, filter, RF modulator, and signal processing circuitry. Wireless access system 110 may also comprise a router, server, memory device, software, processing circuitry, cabling, power supply, network communication interface, structural support, or some other communication apparatus. Wireless access system 110 could comprise a base station, Internet access node, telephony service node, wireless data access point, or some other wireless communication system—including combinations thereof. Some examples of wireless access system 110 include a base transceiver station (BTS), base station controller (BSC), radio base station (RBS), Node B, enhanced Node B (eNodeB), and others—including combinations thereof. Wireless network protocols that may be utilized by wireless access system 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Wireless access system 110 communications with communication network 130 over link 121. Link 121 may be configured to communicate over metallic, wireless, or optical links—including combinations thereof. Link 121 may be configured to use time-division multiplexing (TDM), Internet Protocol (IP), Ethernet, optical networking, wireless protocols, communication signaling, or some other communication format—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Media transfer system 140 could be any system where media packets could originate. For example, media packets could originate from another wireless communication device or a web server providing video content. These are just some examples of where media packets could originate and other sources of media packets are possible and may be considered within the scope of the present disclosure.

The above description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless access system for hybrid automatic repeat request (HARQ) block error rate (BLER) control in wireless communications comprising:
   receiving a media packet;
   determining a first time difference between an allowable end-to-end delay for the media packet and a first consumed end-to-end delay for the media packet;
   processing the first time difference to select a first HARQ BLER;
   transferring the media packet from the wireless access system using the first HARQ BLER;

identifying a HARQ negative acknowledgement (NACK) for the media packet;

in response to the NACK for the media packet, determining a second time difference between the allowable end-to-end delay for the media packet and a second consumed end-to-end delay for the media packet;

processing the second time difference to select a second HARQ BLER; and initiating a transfer process for the media packet based on the second HARQ BLER.

2. The method of claim 1 wherein initiating the transfer process for the media packet based on the second HARQ BLER comprises re-transferring the media packet from the wireless access system using the second HARQ BLER.

3. The method of claim 2, wherein the second HARQ BLER is lower than the first HARQ BLER.

4. The method of claim 1 wherein initiating the transfer process for the media packet based on the second HARQ BLER comprises blocking re-transfer of the media packet from the wireless access system based on the second HARQ BLER.

5. The method of claim 4 wherein the second HARQ BLER is higher than the first HARQ BLER.

6. The method of claim 1 wherein determining the first time difference comprises determining the first time difference utilizing a Quality of Service Class Identifier (QCI) data structure.

7. The method of claim 1 wherein determining the first time difference comprises determining the first time difference based on media type.

8. The method of claim 1 wherein the allowable end-to-end delay comprises utilizing a Quality of Service Class Identifier (QCI) data structure.

9. The method of claim 1 wherein the allowable end-to-end delay comprises utilizing media type.

10. The method of claim 1 wherein the first consumed end-to-end delay is determined based on a difference between a timestamp of the media packet and the current time.

11. A wireless access system for hybrid automatic repeat request (HARQ) block error rate (BLER) control in wireless communications, the wireless access system comprising:

a network receiver configured to receive a media packet;

a BLER control system configured to determine a first time difference between an allowable end-to-end delay for the media packet and a first consumed end-to-end delay for the media packet;

the BLER control system configured to process the first time difference to select a first HARQ BLER;

a HARQ transceiver configured to transfer the media packet from the wireless access system using the first HARQ BLER;

the BLER control system configured to identify a HARQ negative acknowledgement (NACK) for the media packet;

the BLER control system configured to determine a second time difference between the allowable end-to-end delay for the media packet and a second consumed end-to-end delay for the media packet;

the BLER control system configured to process the second time difference to select a second HARQ BLER; and the HARQ transceiver configured to initiate a transfer process of the media packet based on the second HARQ BLER.

12. The wireless access system of claim 11 wherein the BLER control system configured to initiate the transfer process of the media packet based on the second HARQ BLER is configured to re-transfer the media packet from the wireless access system using the second HARQ BLER.

13. The wireless access system of claim 12 further comprising:

the BLER control system configured to select the second HARQ BLER which is lower than the first HARQ BLER.

14. The wireless access system of claim 11 wherein the BLER control system configured to initiate the transfer process of the media packet based on the second HARQ BLER is configured to block re-transfer of the media packet from the wireless access system based on the second HARQ BLER.

15. The wireless access system of claim 14 further comprising:

the BLER control system configured to select the second HARQ BLER which is higher than the first HARQ BLER.

16. The wireless access system of claim 11 further comprising:

the BLER control system configured to determine the first time difference utilizing a Quality of Service Class Identifier (QCI) data structure.

17. The wireless access system of claim 11 further comprising:

the BLER control system configured to determine the first time difference based on media type.

18. The wireless access system of claim 11 further comprising:

the BLER control system configured to determine the allowable end-to-end delay utilizing a Quality of Service Class Identifier (QCI) data structure.

19. The wireless access system of claim 11 further comprising:

the BLER control system configured to determine the allowable end-to-end delay utilizing media type.

20. The wireless access system of claim 11 further comprising:

the BLER control system configured to determine the first consumed end-to-end delay based on a difference between a timestamp of the media packet and the current time.

* * * * *